(12) United States Patent
Edmonds

(10) Patent No.: US 11,061,879 B1
(45) Date of Patent: Jul. 13, 2021

(54) FILE INDEXING AND RETROSPECTIVE MALWARE DETECTION SYSTEM

(71) Applicant: MORGAN STANLEY SERVICES GROUP INC., New York, NY (US)

(72) Inventor: Joseph Edmonds, Ellicott City, MD (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/918,992

(22) Filed: Jul. 1, 2020

(51) Int. Cl.
*G06F 7/00* (2006.01)
*G06F 16/22* (2019.01)
*G06F 16/25* (2019.01)

(52) U.S. Cl.
CPC ........ *G06F 16/2272* (2019.01); *G06F 16/252* (2019.01); *G06F 16/258* (2019.01)

(58) Field of Classification Search
CPC .. G06F 16/2272; G06F 16/258; G06F 16/252; G06F 21/565; G06F 2221/2101; G06F 2221/2115; G06F 3/0623; G06F 3/0643; H04L 63/0245
See application file for complete search history.

(56) References Cited

U.S. PATENT DOCUMENTS

| | | | | |
|---|---|---|---|---|
| 8,498,999 B1* | 7/2013 | Bhalotia | ............. | G06F 16/3322 707/767 |
| 2005/0223032 A1* | 10/2005 | Shan | ..................... | G06F 16/258 |
| 2010/0169972 A1* | 7/2010 | Kuo | ....................... | G06F 21/564 726/23 |
| 2012/0084184 A1 | 4/2012 | Raleigh et al. | | |
| 2012/0246303 A1 | 9/2012 | Petersen et al. | | |
| 2014/0007238 A1 | 1/2014 | Magee et al. | | |
| 2014/0101178 A1* | 4/2014 | Ginter | ............... | G06F 16/90335 707/755 |
| 2015/0128274 A1 | 5/2015 | Giokas | | |
| 2015/0154398 A1 | 6/2015 | Jones et al. | | |
| 2015/0281260 A1* | 10/2015 | Arcamone | .......... | H04L 63/1408 726/11 |
| 2015/0372910 A1 | 12/2015 | Janakiraman et al. | | |
| 2016/0234167 A1 | 8/2016 | Engel et al. | | |
| 2017/0013001 A1 | 1/2017 | Friedman et al. | | |
| 2017/0078314 A1 | 3/2017 | Mohanty et al. | | |

(Continued)

*Primary Examiner* — Azam M Cheema
(74) *Attorney, Agent, or Firm* — Weitzman Law Offices, LLC

(57) ABSTRACT

A computer-implemented method for indexing a stream of files is disclosed. The method comprises receiving a file; generating a set of atomic indexes based on the file contents; storing the atomic indexes in a current index; and if the current index reaches a threshold criterion, freezing the current index into a read-only form, propagating the current index to one or more distributed databases, and generating a new index for future insertions. In some embodiments, the method further comprises one or more of providing an interface to query the databases for files matching a particular signature; searching the databases using a YARA-specified signature; converting a user-provided signature in the YARA format to an index-acceleratable format; retrieving a set of files that are possible matches of the particular signature; verifying that each file of the set of files is a match of the particular signature; and providing the files through the interface.

8 Claims, 7 Drawing Sheets

(56) References Cited

U.S. PATENT DOCUMENTS

| | | |
|---|---|---|
| 2017/0279821 A1 | 9/2017 | Flowers et al. |
| 2018/0069877 A1 | 3/2018 | Flowers |
| 2018/0211140 A1 | 7/2018 | Davis |
| 2018/0253439 A1 | 9/2018 | Ramirez et al. |
| 2018/0268138 A1 | 9/2018 | Quintero Ramirez et al. |
| 2018/0349421 A1 | 12/2018 | Sitsky et al. |
| 2018/0359267 A1 | 12/2018 | Hovor et al. |
| 2019/0081959 A1 | 3/2019 | Yadav et al. |
| 2019/0130105 A1 | 5/2019 | Quintero Ramirez |
| 2019/0132335 A1 | 5/2019 | Flowers et al. |
| 2019/0268357 A1 | 8/2019 | Rostamabadi et al. |
| 2019/0297099 A1 | 9/2019 | Flowers |
| 2019/0312891 A1 | 10/2019 | Stevens et al. |
| 2019/0312904 A1 | 10/2019 | Stevens et al. |
| 2020/0167330 A1* | 5/2020 | Ge .................... G06Q 10/1093 |
| 2020/0019554 A1 | 10/2020 | Poirel et al. |
| 2020/0019891 A1 | 10/2020 | Poirel et al. |

* cited by examiner

FILE INDEXING AND RETROSPECTIVE MALWARE DETECTION SYSTEM

FIELD OF INVENTION

This application relates to systems for and methods of automated file analysis, and more specifically, to scalable, cloud-based systems for detecting or observing the qualities of malware to which a number of networked computing devices have been exposed.

BACKGROUND

In the modern, interconnected computing world, trillions of files are transmitted between computers on the Internet or other networks every day. A received file may, regardless of its name or its apparent filetype, contain malware that harms a computer when the file is opened or executed.

Existing antivirus and security systems generally act independently—an update with canned heuristics for malware detection is received, the antivirus system sequentially receives the files received or opened by the computing device executing the antivirus, and the antivirus returns a verdict regarding the likelihood that the file contains malware. This local analysis fails to detect trends in real-time and relies on the receipt of updates on a regular basis to remain effective.

Moreover, existing antivirus systems tend to produce output that is not easily incorporated into automated systems, instead focusing on generating a user interface to warn the user and interfere with the malware's operation.

Thus, there are advantages to having a system that can quickly and accurately analyze large numbers of files potentially containing malware in real time and that can be incorporated into an automated system for obtaining and using information without necessitating human involvement.

SUMMARY OF THE INVENTION

A computer-implemented method for indexing a stream of files is disclosed. The method comprises receiving a file; generating a set of atomic indexes based on the file contents; storing the atomic indexes in a current index; and if the current index reaches a threshold criterion, freezing the current index into a read-only form, propagating the current index to one or more distributed databases, and generating a new index for future insertions.

In some embodiments, the method further comprises one or more of providing a user interface or programmatic interface to query the one or more distributed databases for files matching a particular signature; searching the one or more distributed index databases using a Yet Another Recursive/Ridiculous Acronym (YARA)-specified signature; converting a user-provided signature in the YARA format to an index-acceleratable format; retrieving a set of files from storage for which one or more distributed databases indicates a possible match of the particular signature; verifying that each file of the set of files is a match of the particular signature; and providing the files through the user interface or programmatic interface to a user who requested them.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

DETAILED DESCRIPTION

In order to address the issues described above, a cloud-based, scalable system is provided to gather files, perform static and dynamic analysis of the file contents, store the file in an indexed database for rapid search functionality, and provide an application programming interface (API) to allow searching for similar files that are known to exist once a new malware campaign or strategy is noticed "in the wild." The system need not necessarily determine the malice of any particular file at the moment that a file is first received, but rather can build up a more robust database of information so that when a file is discovered to be malicious, a retrospective look at the database can provide information about when the malware campaign began, discover trends in the use of a particular malware technique, and identify files that use the particular malware technique even if no one has yet attempted to use the file and been harmed by it. The system can be used for research and strategy purposes in planning future technology policies, as well as power an anti-malware system via information received from the API.

Figure 1:
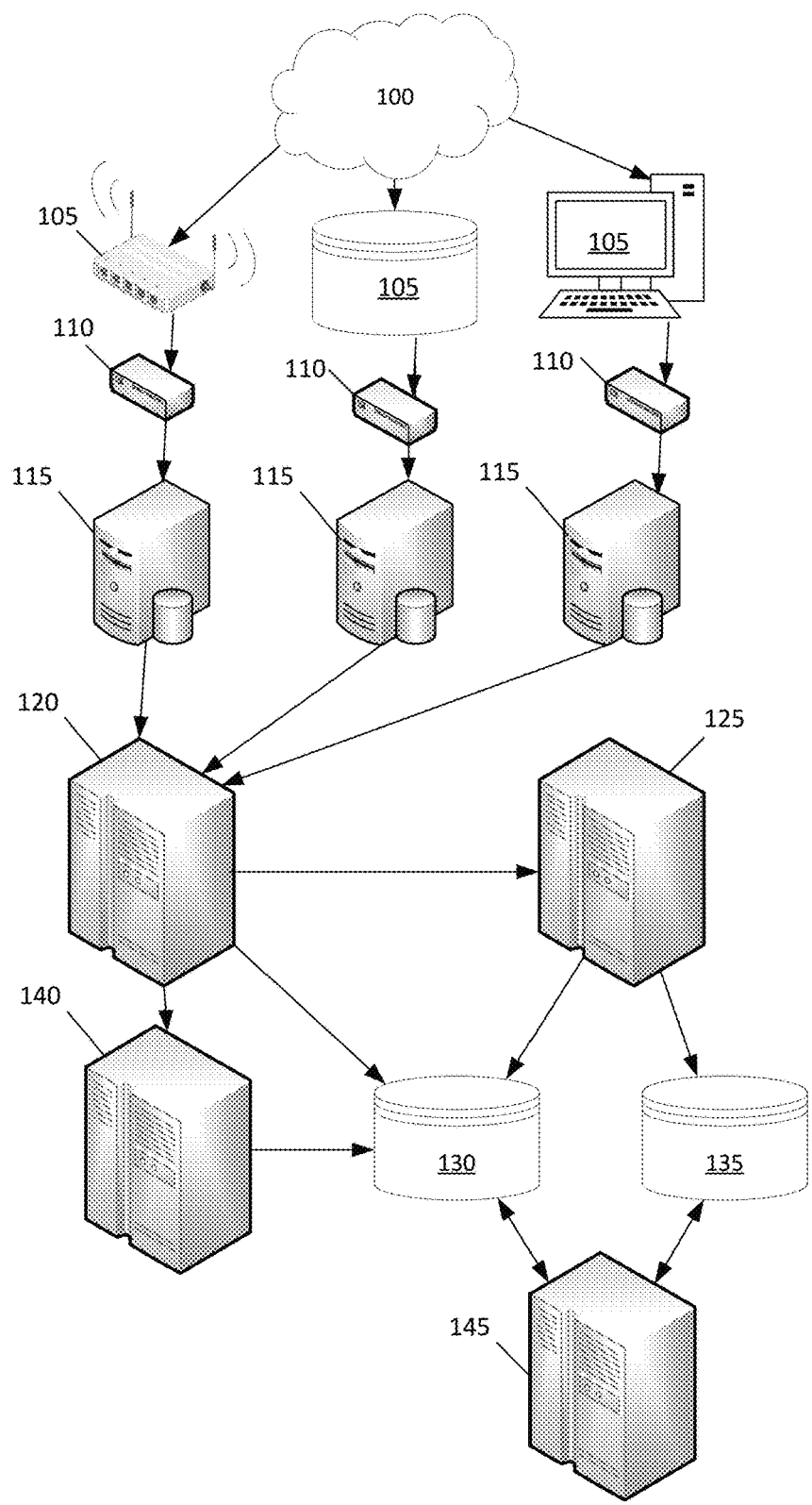
FIG. 1 depicts a network of computing devices to be used in a system for capture, analysis, and triage of possible malware in files.

FIG. 1 depicts a network of computing devices to be used in a system for capture, analysis, and triage of possible malware in files.

When a file is transmitted through the Internet 100 (or any other network, such as an ethernet, other local area network, wide area network, wireless network, etc.), it is received and stored temporarily or permanently by a network node 105. A node 105 may be a router passing a packet containing the file on to another address within the network, an enterprise file repository acting as a cloud-based storage for files uploaded to a service, a particular personal computer that has requested download of a file, or any other computing device connected to the network.

A collection of sensors 110 monitor the set of files received by a corresponding collection of network nodes 105, either at the moment of transit to and receipt by a node 105 or by receiving data from the node 105 after a file is already fully downloaded. As a result, the sensors 110 can capture both "data in motion" and "data at rest." The sensors 110 may be passive (for example, a router 105 may forward a copy of all traffic received by the router to a sensor, or the sensor may be a tap on a cable or bus leading to a node 105)

or may instead be active (for example, a sensor 110 may periodically query a file repository or database to see which files have been recently uploaded, or may review a log of files downloaded by a browser on a user's computer to perform out-of-band acquisitions). When a sensor is active, it may prioritize searching for files sent by particular protocols (such as HTTP and SMTP) while placing a lower priority on capturing files sent by other protocols.

A number of intermediate agent devices 115 are in communication with the sensors 110 and with a source collection subsystem 120. Whenever a sensor 110 observes a file being transmitted or previously transmitted through the network 100, the file is passed from the sensor 110 to an intermediate agent device 115. The intermediate agent device 115 holds the file in local memory for a period of time, while communicating with the source collection subsystem 120 (according to a method described further below in FIG. 2) to determine whether the source collection subsystem 120 needs to receive the file for analysis. If approval to transmit the file is received from the source collection subsystem 120, the intermediate agent device 115 sends the file to the source collection subsystem 120; otherwise, the file is deleted or allowed to be eventually overwritten in the memory of the intermediate agent device 115.

After a file is transmitted to the source collection subsystem 120, it is analyzed by analysis subsystem 125 (according to a method described further below in FIG. 3), the file itself and all embedded files are stored in a long-term storage 130, and entries based on the file (such as attributes of the file or parsed subsequences from the file) are stored in an indexed analysis storage 135. In a preferred embodiment, an Elasticsearch database is used for the indexed analysis storage 135 and S3 is used for the long-term storage 130. A particular indexing subsystem 140 (described further below in regards to FIG. 4) generates indexes for the long-term storage 130 to facilitate searches of those files.

An interface server 145 can be used to provide a number of services to an organization or user. For example, the interface server 145 may provide a web-based REST API or SOAP API to allow other developers to build applications that can run on any networked computing device, request files stored in the long-term storage 130, request summaries or digests of data stored in the indexed analysis storage 135 or long-term storage 130 (for example, a list of the names of all files that satisfy a particular search query and the hashes of those files), or request reports regarding a timeline of when files matching a query began to be stored in the indexed analysis storage 135 or long-term storage 130.

Although a particular division of functions between devices is described in the system above, other configurations are possible in which functions are divided among devices differently. For example, all of the functions of the source collection subsystem 120, the analysis subsystem 125, the indexing subsystem 140, and the interface server 145 may be performed by a single device with multiple threads executing different software modules simultaneously. Alternatively, each system may in fact be a cluster of computing devices sharing functionality for concurrent processing. The specific number of computing devices and whether communication between them is network transmission between separate computing devices or accessing a local memory of a single computing device is not so important as the functionality that each part has in the overall scheme.

Further, although the systems the source collection subsystem 120, the analysis subsystem 125, the indexing subsystem 140, and the interface server 145 are described as if they are one computing device or cluster each, a cloud-based solution with multiple access points to similar systems that synchronize their data and are all available as backups to one another is preferable to a unique set of computing devices all stored at one location.

Figure 2:
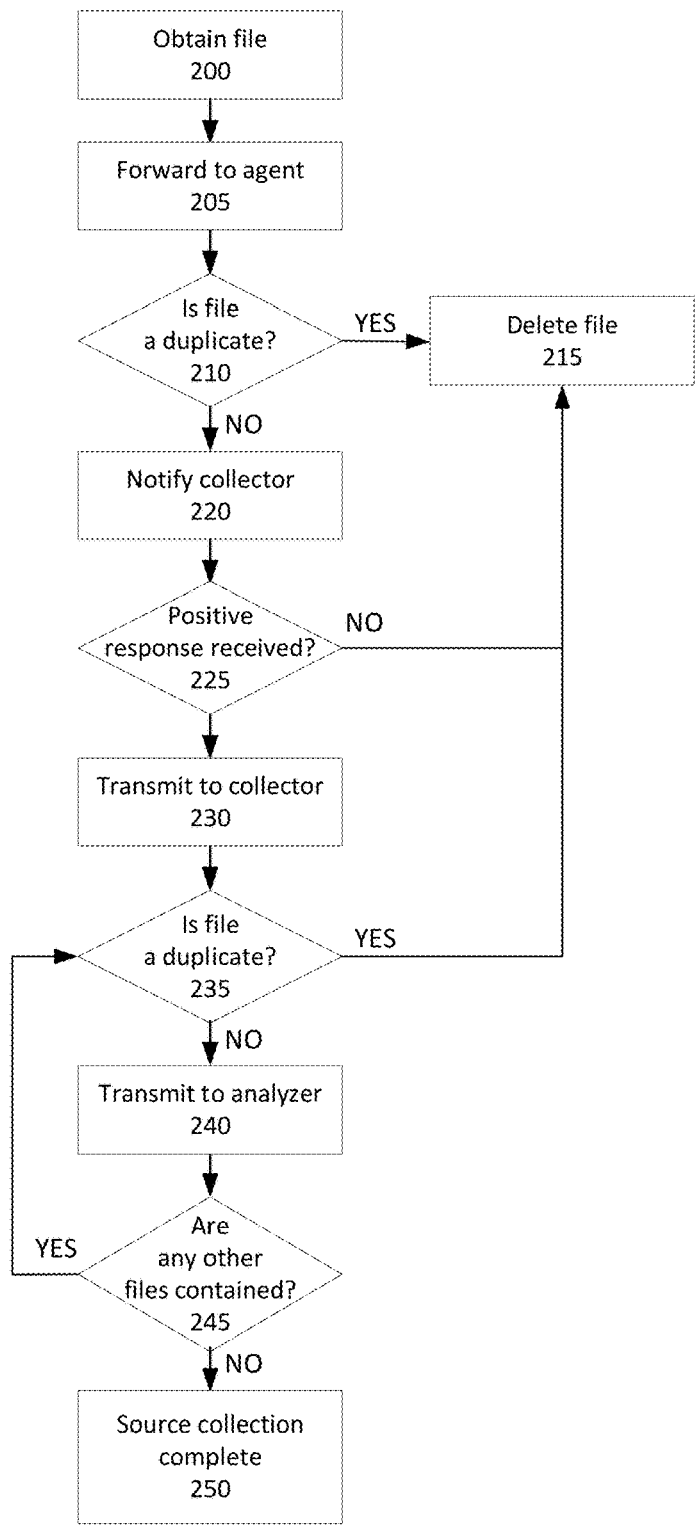
FIG. 2 depicts a method for determining whether to collect a sample file for analysis and indexing for later use, by the abovementioned system.

FIG. 2 depicts a method for determining whether to collect a sample file for analysis and indexing for later use, by the abovementioned system.

Initially, a file is either passively received by a sensor 110, or is retrieved by an active searching functionality of the sensor 110 (Step 200).

The file is then forwarded to an intermediate agent device 115 (Step 205) to begin the process of determining whether to forward the file further to the source collection subsystem 120.

First, the intermediate agent checks a local deduplication data structure that tracks files that have already been sent to or offered to the source collection subsystem 120 (Step 210). In a preferred embodiment, this data structure is a Bloom filter. While any data structure could be theoretically used (such as one with a very high false positive rate that treats two files as identical if they merely share their filename, regardless of contents, or one with no false positives because the full contents of the file are stored and compared to determine whether they are identical), Bloom filters provide a good tradeoff between accuracy, speed, and memory usage. Instead of hashing an input once and inserting a record into a hash table, as traditional hash tables do, a Bloom filter hashes an input multiple times using different hashing functions, and stores an indicator at each resulting index of the hash table that some file was hashed to match to this index. During a lookup, if the indicator is missing at any index, the Bloom filter can report definitively that the input was not previously inserted; if every index does have the indicator, it is highly likely that the input was inserted, but depending on the collision rate of the hash functions used, it is possible that a set of previously inserted inputs managed to overlap with the same set of indicators. The tolerance for a higher collision rate allows Bloom filters to use hash functions that are not cryptographically secure but are much less computationally expensive, which are ideal for the rate of file processing needed by the intermediate agent 115.

In other contexts, a Least Recently Used (LRU) cache may be used instead of a Bloom Filter. Although an LRU cache has a much better rate of false positives, it requires much more memory available and is less preferred in most contexts.

Whether the deduplication scheme uses a Bloom filter, an LRU cache, or another technique, the scheme should attempt to ensure that if the file has been seen, the agent has a record of that possible sighting, and will not return a determination that the file has not been seen if it has actually been seen. The goal of the deduplication is a balance between the choice to prioritize not processing a same file twice over accidentally failing to collect a particular file for analysis, given the volume of files to be processed (in one embodiment, over 8,000,000,000 files per day) and the computational cost of processing the file by the analysis subsystem 125.

In some embodiments, including a preferred embodiment, the deduplication process must keep track only of files seen within a certain recent interval of time, as the storage of meta-information or full files may be prohibitively expensive. The deduplication process may continually curate the set of recently seen files to deduplicate against, culling files that are, for example, more than a day old, more than a week old, or some other interval of time.

If the file is apparently not a new one according to the deduplication process, the intermediate agent deletes the file from memory (Step 215) or allows it to be overwritten as new files are stored.

If the file is apparently a new one that the intermediate agent has not seen before, it is retained in memory. A message is transmitted to the source collection subsystem 120 notifying it that a file has been received and providing metadata on the file (including, in some embodiments, filename, file size, and other characteristics of the file's context, such as the protocol by which it was transmitted, the URL from which it was obtained, or the file system location to which it was saved) (Step 220). The source collection subsystem 120 will check a simple cache to see whether a file with the given metadata has ever been requested from an intermediate agent 115.

In the meantime, the intermediate agent 115 waits for a response indicating that the source collection subsystem 120 needs the file (Step 225). If an optional negative response to the transmission offer is received from the source collection subsystem 120, the file is deleted or overwritten. Similarly, if a predetermined window of time passes without receiving a response, a negative response is implied and the file is deleted or overwritten. The predetermined response wait time may be one second, one minute, or more, depending on factors such as the rate at which the intermediate agent 115 is receiving files, the size of the files and the amount of memory available to the intermediate agent 115, and the latency or ping in communications between the intermediate agent 115 and the source collection subsystem 120.

If instead a positive response is received, the file is transmitted from the intermediate agent 115 to the source collection subsystem 120 (Step 230).

The source collection subsystem 120 then performs a similar deduplication process to the one that the intermediate agent 115 had performed, now that it has access to the file rather than only metadata (Step 235). The additional deduplication stage is advantageous because the source collection subsystem 120 is in communication with multiple intermediate agents, and as a result there may be many files that are unique at the agent level but duplicates at the global level. If two agents both report what was thought to be a new file because of some differing metadata, only one copy of the file should be ultimately processed.

Once the file has been deduplicated, it is transmitted to the analysis subsystem 125 (Step 240).

The intake process and deduplication steps preferably also take into account that files may contain or be vehicles for the delivery of other files, necessitating a recursive deduplication process (Steps 235 through 245). If a file that has been transmitted to the analysis subsystem 125 contains another file (Step 245) that is discovered during structural or behavioral analysis, the contained file is returned to the source collection subsystem 120 and is also deduplicated (back to Step 235). For example, the intermediate agent 115 may report a .ZIP archive that is determined to be a new file. When unzipped as part of the analysis by analysis subsystem 125, it may contain multiple files, including a Word .DOCX file, each of which is checked by the source collection subsystem 120 to see if it has already been indexed. Then, the Word file may itself contain executable code in the form of a macro or an OLE (Object Linking and Embedding) object, which is also extracted from the file by the analysis subsystem 125 and checked by the source collection subsystem 120 to see if it has already been indexed. Ultimately, a passive shell such as an archive file may not need to be stored or analyzed if it is just a new delivery system for an already indexed file. In some embodiments, the shell file may nonetheless be stored to facilitate warning users that a shell with a particular filename or other qualities has been known to harbor malware in past observations. In some embodiments, the analysis subsystem 125 may have its own deduplication process distinct from that of the source collection subsystem 120, eliminating the need for recursively discovered files to be transferred back and forth between the two subsystems. Alternatively, the analysis subsystem 125 may have an agent that performs the handshake of Steps 200 through 225 as if the analysis subsystem 125 were just another agent in communication with the source collection subsystem, such that the file is transmitted back to the source collection subsystem only if metadata indicates it likely has not been seen before. After the aggressive deduplication, the total number of files that are actually analyzed can be reduced, in one embodiment, from over 8 billion files per day to only 400,000 files per day.

Once all files have been stored or deleted, the intake process is complete (Step 250).

Figure 3:
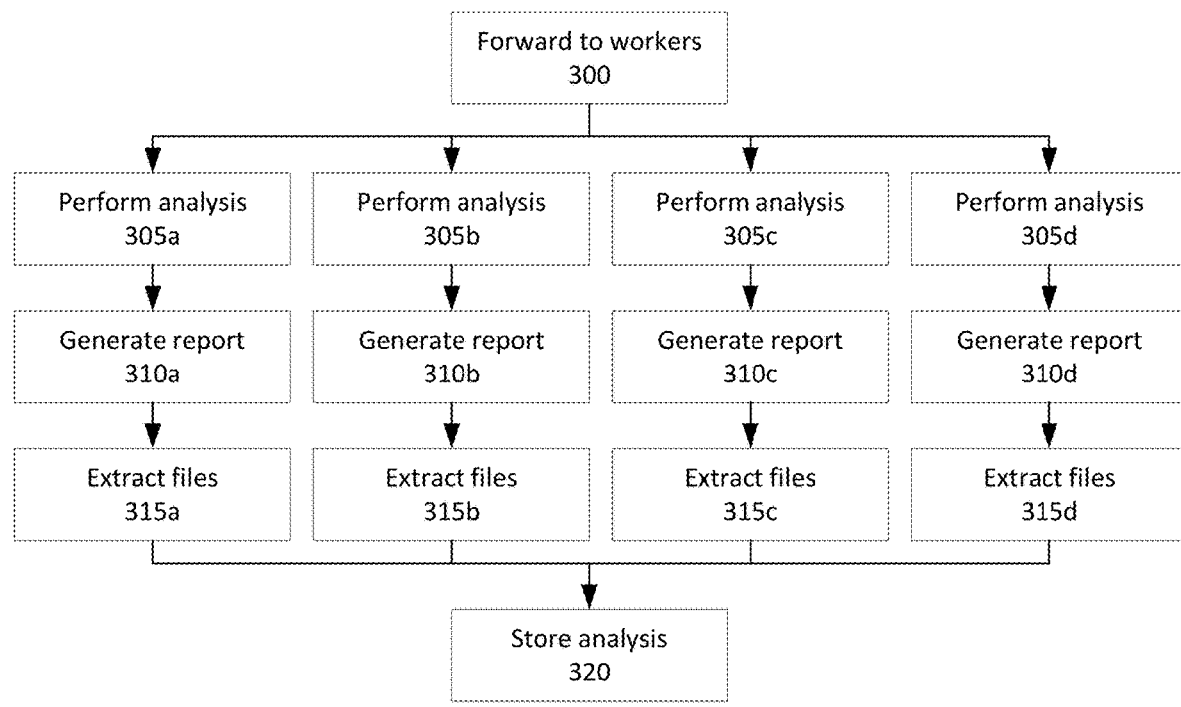
FIG. 3 depicts a method for analyzing an incoming file for characteristics to be used in a later determination of possible malware or malicious behavior.

FIG. 3 depicts a method for analyzing an incoming file for characteristics to be used in a later determination of possible malware or malicious behavior.

Initially, the file is forwarded to a set of worker daemons (Step 300). Each worker daemon has a specific analysis task it performs (Steps 305*a*-305*d*, occurring in parallel) and which it uses to generate a machine-readable report on an aspect of the file (Steps 310*a*-310*d*, occurring in parallel) and possibly produce extracted files (Steps 315*a*-315*d*). The analysis task is typically specialized for a particular file input type. For example, one daemon may be specialized to check whether the file is an archive and if so, if the archive contains files that should be extracted and sent back to the source collection subsystem 120. Another daemon might parse OLE objects that are present in word processing documents or other files generated by Microsoft software. Other daemons may apply YARA or other antivirus analysis techniques to the file; decode bytestrings in the file that have been encoded in other forms such as base64, hexadecimal, or other encoding formats; perform static analysis of particular features of the file, such as whether it contains a printable string or opens a network connection; or perform dynamic analysis of the file, such as executing a file in a sandboxed environment to determine how the file attempts to behave in various computing environments.

Based on what each worker daemon finds, the machine-readable reports are forwarded to the indexed analysis storage 135 (Step 320), facilitating an API that can search for all files having a particular characteristic in static analysis or a particular behavior during dynamic analysis.

In a preferred embodiment, the machine-readable reports are each in the Javascript Object Notation (JSON) format, as a tradeoff between concise file format, compatibility and integration with various software systems, and human readability during development and debugging. However, other standardized formats, such as XML or YAML, or a serialized object from an object-oriented programming language, could alternatively be used in other systems adapted for them.

Meanwhile, the file is also forwarded from the source collection subsystem 120 to an indexing system 140 to make it possible for the billions of raw files that are collected to be efficiently searched.

Figure 4:
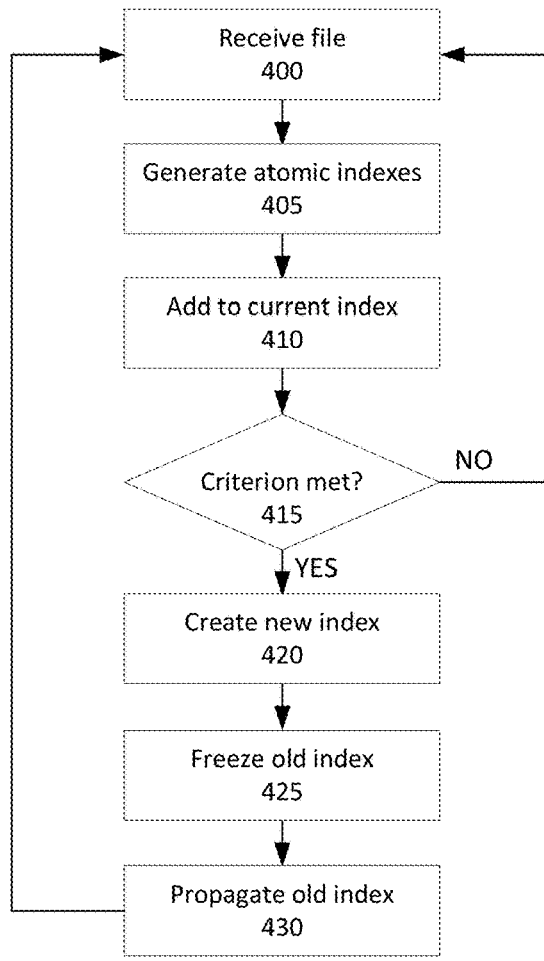
FIG. 4 depicts a method for indexing information from the stored files to keep index sizes manageable and ensure availability for queries.

FIG. 4 depicts a method for indexing information from the stored files to keep index sizes manageable and ensure availability for queries.

The default state of the indexing subsystem 140 is waiting for a file sample to be received from the source collection subsystem 120 (Step 400).

When the file is received, the indexing subsystem 140 generates a set of atomic indexes based on particular distinct subsets of the file's data (Step 405). This allows searching for a particular substring to be a particularly fast lookup operation, and is suitable for searching via a reduced form of the Yet Another Recursive/Ridiculous Acronym (YARA) specification, which searches for substrings and byte patterns in a given file that may indicate that file's malice. The reduced form retains many of the search functionalities specified by YARA but may omit certain functionalities with a computational component (such as counting the instances of a substring or parsing an expression) that cannot be accelerated through acting on an index, either because the index does not preserve all necessary data, or because the computation cost will be the same whether or not an index exists.

Next, the indexer adds these atomic indexes into a currently active index (Step 410).

The currently active index is changed when a certain criterion based on size or age is reached (Step 415). If the index does not meet the criterion, the system goes back to waiting for a new file to be received. In a preferred embodiment, the criterion is an age of one day, though it could easily be shorter or longer based on the needs and capacities of the system; similarly, an index size criterion (in terms of the file size or the number of entries it contains) may be set based on the computing limitations or speed considerations as a particular index grows.

If criterion is met, the system creates an empty, new currently active index (Step 420). The old active index is frozen into a read-only state (Step 425), and the system propagates the index to all copies of the long-term storage 130, to be joined to other old indexes (Step 430) and facilitate fast querying via the API. In a preferred embodiment, UrsaDB is a database system has monolithic indexing and can be easily scaled horizontally in this manner.

Figure 5:
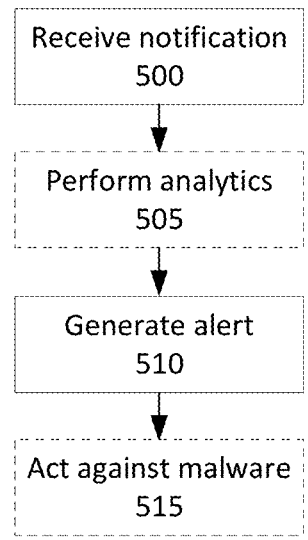
FIG. 5 depicts a method for automatically monitoring and responding to a possible malware campaign.

FIG. 5 depicts a method for automatically monitoring and responding to a possible malware campaign.

First, the system receives (at either the interface server 145 or another computing device) a notification that a malware campaign exists with a certain quality—for example, a "Yet Another Recursive/Ridiculous Acronym" (YARA) definition of the genus of malware (Step 500).

An example YARA rule might look like this one, which searches for a particular URL and/or two particular strings of bytes surrounding a wildcard:

rule new_malware: malware
{
  meta:
  description="A possible malware in the wild"
  threat_level=3
  in_the_wild=true
  strings:
  $a={6A 40 68 ?? ?? ?? ?? 6A 14 8D 91}
  $b="http://knownscammingsite.com"
  condition:
  $a or $b
}

The system can optionally perform analytics to determine trends and history of the malware identified (Step 505). For example, a timeline may be generated showing when matching files were first detected, how the prevalence of new variations of that genus have changed over time, where it was first seen by the source collection system, and so on.

This information may be helpful in addressing the current malware campaign or for preventing future campaigns that could take advantage of a same vulnerability (for example, if all malware is being targeted to the computers of a particular department of an organization, that department may need more stringent computer use policies compared to other departments).

The system can also either generate automated alerts or enable interactive alerting from investigators and target the alerts to human recipients best able to act on the information (Step 510). For example, if a particular file is known to be malware received by an intermediate agent running on a human's computer, an email or text may be generated to that human user indicating that the file is malware, and that the file should be deleted from their computer immediately. Members of an IT or security department may be notified that previously-seen files are now known to be malware and remedial actions is needed, either by email or text as already described, and support tickets may be generated within an existing issue tracking system to ensure that the problem is addressed and facilitate communication among the IT team. Any reports may be cross-indexed with security logs to determine which computers within an organization have downloaded files now known to be malicious and enable a targeted response by the IT team. Reports also provide useful prospective information; for example, a report indicating which filetypes have recently been involved in a particular genus of malware allows change in strategy, such as moving from Word to PDF-only for the required format of purchase orders to a sales department, when a new malicious macro may be present in Word files.

Finally, the system can optionally take automatic action against the malware directly (Step 515). Although in one embodiment, the system may only perform passive analysis and alerting as described above, other implementations could have the necessary access permissions or API access to delete a file containing malware from a computing device, delete an email with a malware attachment from a user's email account, terminate software already running on a computer, disable network access to a computer to prevent spread of malware or information from spyware on that computer, and/or shut off power to a computer.

Figure 6:
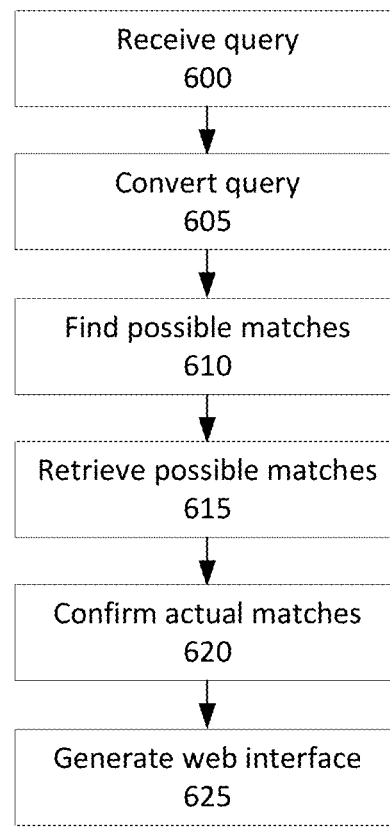
FIG. 6 depicts a method for allowing a human analyst to perform distributed index-accelerated searches with files in the storage system.

FIG. 6 depicts a method for allowing a human analyst to perform distributed index-accelerated searches with files in the storage system.

First, a web frontend provided by the API server 145 or another server receives a search query from a user, ideally in the form of a YARA rule (Step 600). This YARA rule may be created by a human user for malware analysis purposes, or may have been found by the human user in a repository of malware signatures identified elsewhere.

Next, the web frontend (or the backend software that processes it) converts the query from a YARA rule into an index search query (Step 605).

The index search query is then distributed to search the horizontally-scaled indexes of the long-term storage for a set of possible matches to the YARA rule (Step 610).

For each file in the long-term storage 130 that registers as a possible match based on the indexed information, the file is retrieved from the storage (Step 615) and the YARA rule is used to search and confirm that the file is an actual match (Step 620).

Finally, an API result is generated and optionally may be used to produce a webpage, displaying all actual matches to the user in the web frontend (Step 625). The user is then better equipped with information regarding known malware that matches the specification that the user provided and that was heretofore unknown to the user.

Figure 7:
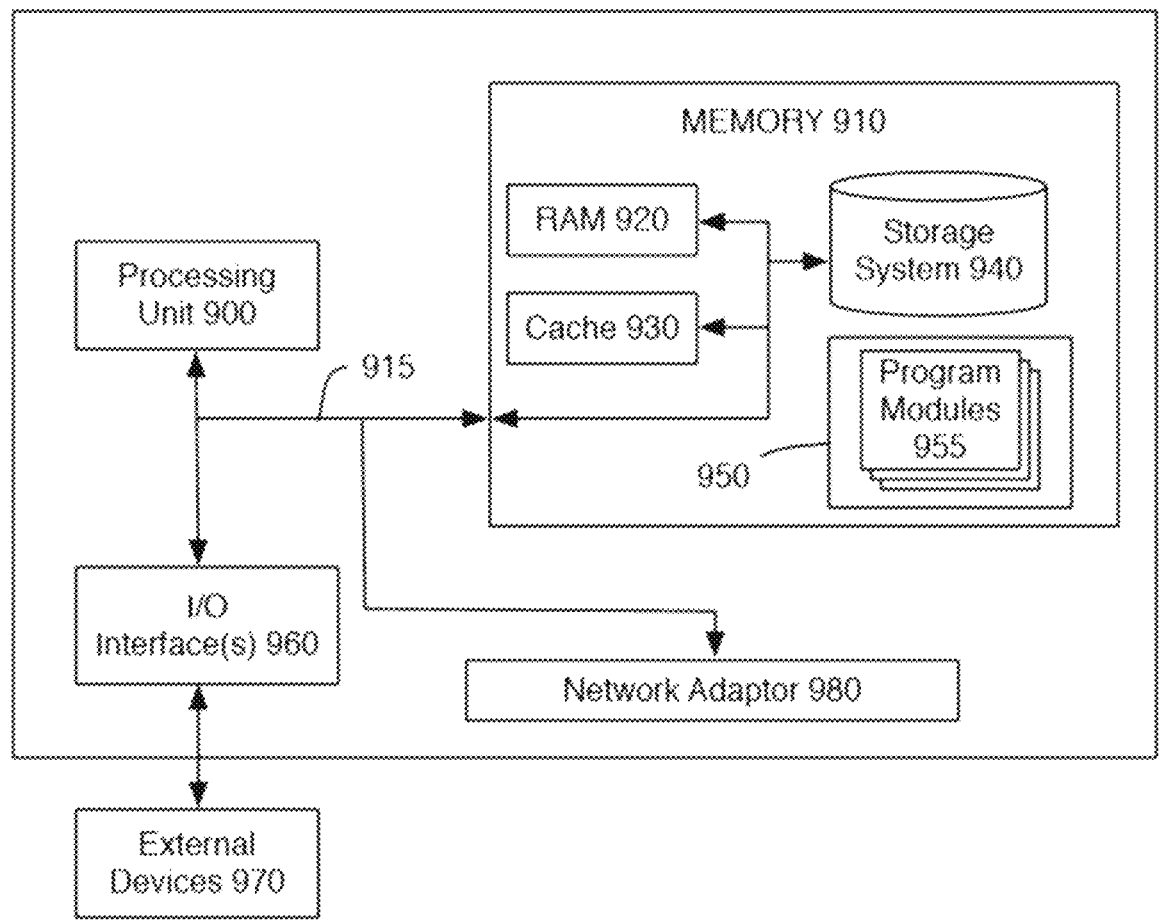
FIG. 7 is a high-level block diagram of a representative computing device that may be utilized to implement various features and processes described herein.

Although FIG. 1 depicts a preferred configuration of computing devices to accomplish the software-implemented methods described above, those methods do not inherently rely on the use of any particular specialized computing devices, as opposed to standard desktop computers and/or web servers. For the purpose of illustrating possible such computing devices, FIG. 7 is a high-level block diagram of a representative computing device that may be utilized for each of the computing devices and/or systems to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer-implemented method for indexing a stream of files and facilitating queries of indexed files, comprising:
   receiving a file;
   generating a set of atomic indexes based on substrings from contents of the file;
   storing the atomic indexes in a current index;
   if the current index reaches a threshold criterion, freezing the current index into a read-only form, propagating the current index to one or more horizontally distributed index databases, and generating a new index for future insertions;
   providing a user interface or programmatic interface to query the one or more horizontally distributed index databases for files matching a particular YARA-specified signature;
   retrieving a set of files from storage for which the one or more horizontally distributed index databases indicate a possible match of the particular YARA-specified signature;
   verifying that each file of the set of files is a match of the particular YARA-specified signature; and
   for only files of the set of files that were a verified match, providing identifiers of the files through the user interface or programmatic interface to a user who requested them.

2. The method of claim 1, wherein the threshold criterion is one of an age and a size.

3. The method of claim 1, further comprising converting a user-provided signature in the YARA format to an index-acceleratable format by identifying one or more YARA format features in the user-provided signature requiring, computation or state-tracking that are not pre-computed or tracked by the index, and removing the identified one or more YARA format features from the user-provided signature.

4. The method of claim 1, wherein the user interface or programmatic interface is a web-based interface accessed via a browser.

5. A system for indexing a stream of files and facilitating queries of indexed files, comprising:
   one or more horizontally distributed index databases;
   one or more processors; and
   non-transitory memory comprising instructions that, when executed by the one or more processors, cause the one or more processors to:
   receive a file;
   generate a set of atomic indexes based on contents of the file;
   store the atomic indexes in a current index; and
   if the current index has reached a threshold criterion, freeze the current index into a read-only form, propagate the current index to the one or more horizontally distributed index databases, and generate a new index for future insertions;
   provide a user interface or programmatic interface to query the one or more horizontally distributed index databases for files matching a particular YARA-specified signature;
   retrieve a set of files from storage for which the one or more horizontally distributed index databases indicate a possible match of the particular YARA-specified signature;
   verify that each file of the set of files is a match of the particular YARA-specified signature; and
   for only files of the set of files that were a verified match, provide identifiers of the files through the user interface or programmatic interface to a user who requested them.

6. The system of claim 5, wherein the threshold criterion is one of an age and a size.

7. The system of claim 5, wherein the instructions, when executed, further cause the one or more processors to:
   convert a user-provided signature in the YARA format to an index-acceleratable format by identifying one or more YARA format features in the user-provided signature requiring computation or state-tracking that are not pre-computed or tracked by the index, and removing the identified one or more YARA format features from the user-provided signature.

8. The system of claim 5, wherein the user interface or programmatic interface is a web-based interface accessed via a browser.

* * * * *